US006904605B2

United States Patent
Platte et al.

(10) Patent No.: US 6,904,605 B2
(45) Date of Patent: Jun. 7, 2005

(54) SCANNING DEVICE FOR MAGAZINE-TYPE STORAGE MEDIUM AND METHOD THEREFORE

(75) Inventors: Hans-Joachim Platte, Hemmingen (DE); Fritz Weisser, St. Georgen (DE); Wilfried Scheffler, Donaueschingen (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 177 days.

(21) Appl. No.: 10/188,198

(22) Filed: Jul. 2, 2002

(65) Prior Publication Data

US 2003/0021212 A1 Jan. 30, 2003

(30) Foreign Application Priority Data

Jul. 26, 2001 (EP) .......................................... 01118099

(51) Int. Cl.⁷ .............................................. G11B 17/04
(52) U.S. Cl. ................ 720/619; 369/30.83; 369/30.92; 369/30.85
(58) Field of Search ....................... 720/619; 369/30.83, 369/30.92, 30.85

(56) References Cited

U.S. PATENT DOCUMENTS 4,980,883 A * 12/1990 Mutou et al. ............... 369/291
5,400,310 A * 3/1995 Morikawa et al. ......... 369/75.2
2002/0172108 A1 * 11/2002 Moreira et al. .......... 369/30.36

FOREIGN PATENT DOCUMENTS

| EP | 0366452 | | 5/1990 | |
| EP | 0871168 | | 10/1998 | |
| EP | 1 280 146 A1 | | 1/2003 | ........... G11B/17/30 |
| JP | 07201152 A | * | 8/1995 | ........... G11B/23/03 |
| JP | 08279266 A | * | 10/1996 | ......... G11B/23/023 |
| JP | 09007282 A | * | 1/1997 | ........... G11B/17/26 |
| WO | 01/59787 | | 8/2001 | |

OTHER PUBLICATIONS

Search Report for EPO Patent Application No. 01118099.9 dated Dec. 12, 2001.

* cited by examiner

*Primary Examiner*—William J. Klimowicz
(74) *Attorney, Agent, or Firm*—Joseph S. Tripoli; Harvey D. Fried; Patricia A. Verlangieri

(57) ABSTRACT

A scanning device for magazine-type storage media, especially magazine player for optical disks, and a method to drive such player, the player being provided to cooperate with a magazine-type container having extremely dense packaging of storage media, where the storage media are secured against damages even when they are removed from the container. The disks are coupled to trays of the container. For playback the container is inserted into a playback device, a tray of the container is moved into a playback position, a disk is released from the tray and coupled to a mechadeck for playback.

11 Claims, 13 Drawing Sheets

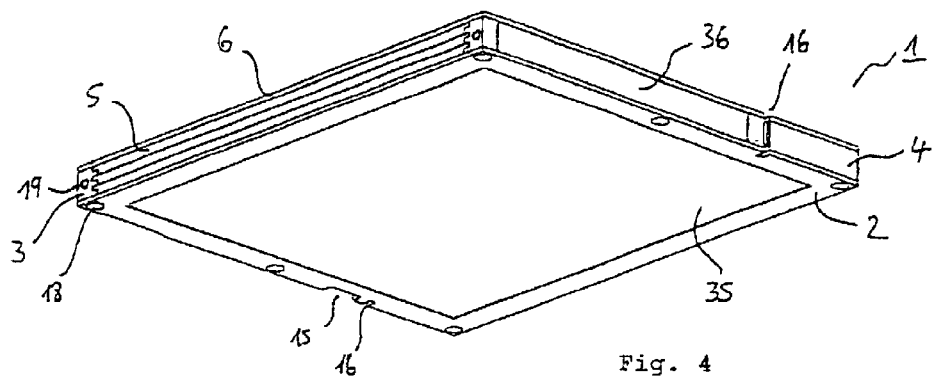
Fig. 4
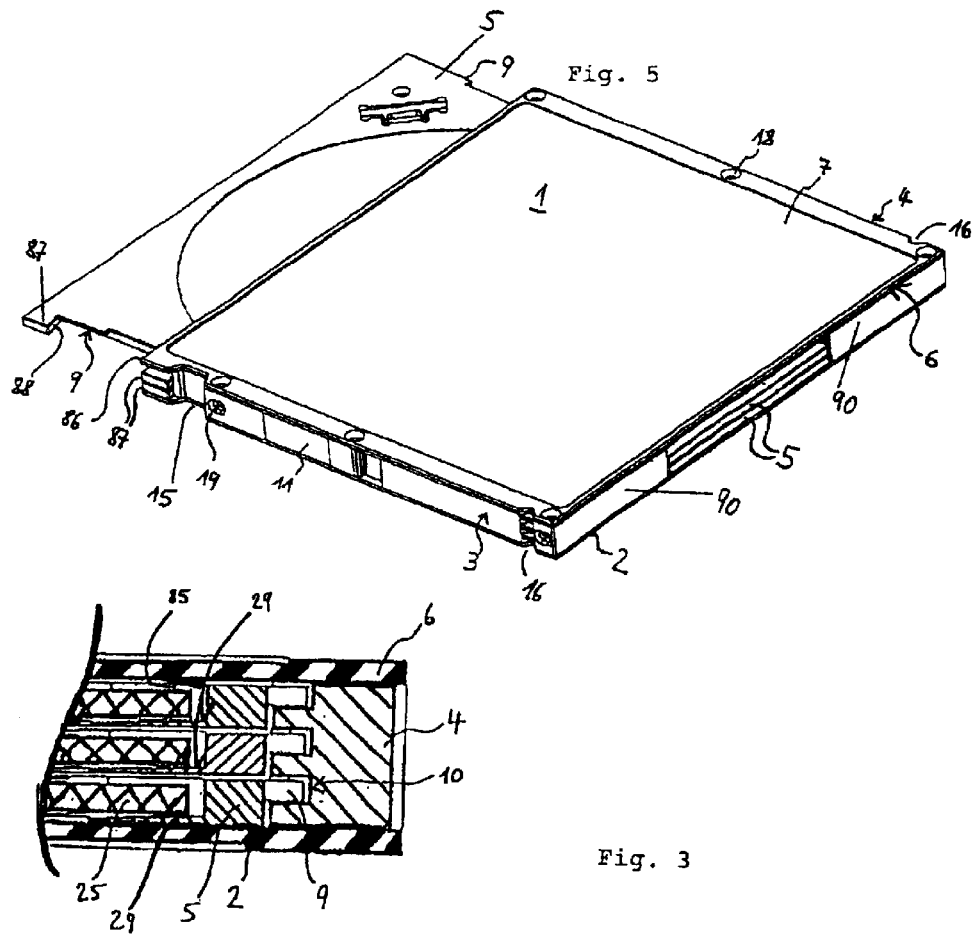
Fig. 5
Fig. 3

SCANNING DEVICE FOR MAGAZINE-TYPE STORAGE MEDIUM AND METHOD THEREFORE

FIELD OF THE INVENTION

The invention relates to a scanning device for magazine-type storage media, especially magazine player for optical disks, and a method to drive such player, the player being provided to cooperate with a magazine-type container having extremely dense packaging of storage media.

BACKGROUND OF THE INVENTION

Known concepts of scanning devices using storage media housed in a container give access to a storage medium via an opening of the container. The storage medium is secured against damages by the container, often referred to as cartridge. However, dense packaging is not possible here. Known magazine-type containers do also not provide for extremely dense packaging of storage containers.

SUMMARY OF THE INVENTION

An object of the invention is to provide a scanning device for storage media provided in a magazine-type container having dense packaging where the storage media are secured against damages even when they are removed from the container.

According to the invention a scanning device for storage media the storage media being coupled to a tray of a container, in which several storage media are housed and which tray is removed completely from the container for enabling scanning of the storage medium, the container being insertable into and removable out of the scanning device comprises: an optical pickup which is arranged on a mechadeck, the mechadeck being moveable towards a first side of a tray when this tray is removed from the container. Said first side corresponds to the side of the scanning medium at which scanning, i.e. reading or writing, is performed by means of the optical pickup. The mechadeck is further provided with a disk release ring, which is either moveable relative to the mechadeck towards or away from the tray in said removed position or it is fixed in said direction. The disk release ring being moveable in order to actuate a disk holder of the tray. Preferably, the disk release ring is rotated about a small angle for releasing disk holders of the tray thus releasing the recording medium, preferably a disk, from the tray. The disk release ring has the shape of an open ring, also called c-shape, and is moveable towards the same side of the tray as the mechadeck. That means that the disk release ring is moved towards or away from the tray at the same first side of the tray as the mechadeck, that is the side of the tray, at which the disk can be taken away from the tray. This has the advantage that the disk release ring is directly coupled to the mechadeck thus not needing a special actuator or special construction parts to hold it in said position. This also reduces the necessary space, especially above the tray position. The open ring shape of the release ring is preferably a c-shape, however, it is not necessarily a circular ring but can also have the shape of a horseshoe or any other open shape, which allows for correct positioning of disk release means as disk release pins on the disk release ring. This shape might well be rectangular shape, square shape or any other polygon shape. An advantage of the open ring shape is that through the opening scanning access, e.g. reading or writing access, to the disk is possible without conflicting with the release ring. Further, undisturbed movement of the pickup is made possible thereby. The storage media are coupled to a tray and thereby secured by the tray against damages even when the tray and thus the disk is removed from the container. Even in this case, the disk stays coupled or affixed to the tray.

Advantageously the device according to the invention is provided with a clamper being moveable towards said tray in its removed position from the opposite side compared to the mechadeck. This has the advantage to surely affix the recording medium to the mechadeck. Further, it allows to use conventional design of mechadecks having a damper to be used with the device according to the invention without necessity of extensive redesign. Instead of using a clamper a fixing of recording medium to the mechadeck, especially to a turntable of the mechadeck, is also be possible according to the invention via clip fixing the recording medium to the turntable. Such clip fixation is preferably releasable via an actuator being moveable towards said tray from said opposite side.

According to the invention the device is provided with a sensor for detecting direct or indirect contacting of mechadeck and tray. Direct contacting means for example that a part of the mechadeck directly contacts the tray. This part is preferably the sensor itself, or a sensor attached to the disk release ring or any other arrangement performing a similar task. Indirect contact means for example contacting via the recording medium either in its position coupled to the tray or in its position coupled to the mechadeck. In the first case a turntable of the mechadeck contacts the disk, in the latter case the recording medium comes into contact with the tray and this contact is sensed. Sensing when mechadeck and tray come into contact has the advantage that the respective movement can then be stopped at the optimum position. Moving the mechadeck too far could result in deformation or even destruction of recording medium and/or tray while stopping the movement too early might not allow for correct releasing of the scanning medium from the tray or coupling the recording medium to the tray.

Preferably the movement of said mechadeck towards or away from the tray is a tilting movement. This has the advantage that conventional means for performing such tilting movement of the mechadeck can be used without any or without great change of design. At first glance it seems to be impossible to use a tilting movement of the mechadeck as the trays coming from different positions in the container are arranged at different height positions with respect to the mechadeck. Therefore, in case of a tilting movement parallel orientation of mechadeck and tray can only be reached for one of the tray positions while for the other tray positions at least a slight angle remains. This non-parallel orientation may lead to problems when trying to release the storage medium from the tray or when affixing it to the tray. However, according to the invention the movement of the mechadeck is stopped or made slower as soon as the mechadeck comes into contact with the tray such as to only exert an acceptable force to the storage medium. For releasing the storage medium from the tray, tray release means are opened, the mechadeck is slowly moved away from the tray thus allowing parallel orientation of storage medium and turntable or mechadeck to each other and then the storage medium is fixed to the mechadeck. When bringing back the disk to the tray, the movement of the mechadeck is stopped as soon as the disk comes into contact with the tray. Then coupling between storage medium and mechadeck is removed or at least released and the mechadeck is slowly moved further towards the tray until the storage medium and tray are in parallel orientation, thus allowing correct coupling of storage medium to tray. That means the disk assumes a non-parallel orientation with regard to the tray only in cases where such is save, e.g. because it is affixed to the mechadeck or because it is in contact with the tray and the mechadeck thus being affixed against slip or getting out of place. Preferably, the disk release ring is provided with disk release pins, which are arranged slightly outwardly of the outer rim of the recording medium. This has the advantage that exact positioning of the recording medium is assured by means of these pins and exact centering with regard to mechadeck and/or tray is assured. Getting sidewardly out of position of the storage medium is prevented even when it is not affixed to any of tray and mechadeck. This is especially advantageous in case of upend positioning, i.e. when the plane of the storage medium is oriented not parallel to the surface of the earth, i.e. when its main axis of rotation is not in the same direction as direction of gravitation.

A device according to the invention is provided with guiding rails being arranged corresponding to the different positions of said trays inside said container. Preferably, at least one of these rails is fixed in its position to the device and thus does not need to be moved. It is fixed independent of which tray of the container is to be removed from the container. This has the advantage that this guide rail is adjusted once during production of the device and does not need adjustment with regard to the position of the trays in the container. Therefore, exact relative positioning of guide rail and container is assured. Such exactness is necessary for enabling correct removing of a tray from the container and for moving a tray back to the container. If such is not done exactly malfunction might occur. A guiding rail which is fixed to the device has the advantage that production of the device is made easy and no space for moving means of said guiding rail are necessary. Advantageously a guiding rail is arranged to extend above and below a tray moving slider, which is moved for taking a tray out of the container or returning it back into the container. Such guide rail makes possible movement of tray moving slider as well as guidance of the tray at the side of the tray, at which the tray moving slider attaches it. Preferably, vertical movement of the tray moving slider is coupled to vertical movement of said guiding rail.

Preferably, the height of a tray to be used with the invention corresponds to the sum of heights of bottom plate and cover plate of said container to be used with the invention. This has the advantage that extremely dense packaging is made possible.

A method to move a storage medium from a container housing several trays to which tray a storage medium is coupled into a scanning position of a scanning device comprises the steps of: moving a tray moving slider in a first direction to assume a position to cooperate with one of the trays of the container; moving said tray moving slider in a second direction to remove said tray out of said container into a release position; moving a mechadeck and a disk release ring from the same side towards said tray until the mechadeck and the storage medium come into contact with each other; fixing said storage medium to the mechadeck; releasing the coupling between storage medium and tray; and moving said mechadeck away from said tray to assume the scanning position of the storage medium.

A method according to the invention to move back a storage medium from its scanning position to its position inside said container comprises reversed steps as described above.

BRIEF DESCRIPTION OF THE DRAWINGS

Further advantages can be seen from the figures and the following description of preferred embodiments. The invention, however, is not restricted to these embodiments. Measures within the range of a skilled person are also covered by the invention. The figures show:

FIG. 3: Cross sectional view of a part of a container;

FIG. 4: bottom view of a container;

FIG. 5: different type of container;

DETAILED DESCRIPTION OF PREFERRED EMBODIMENTS

Figure 1:
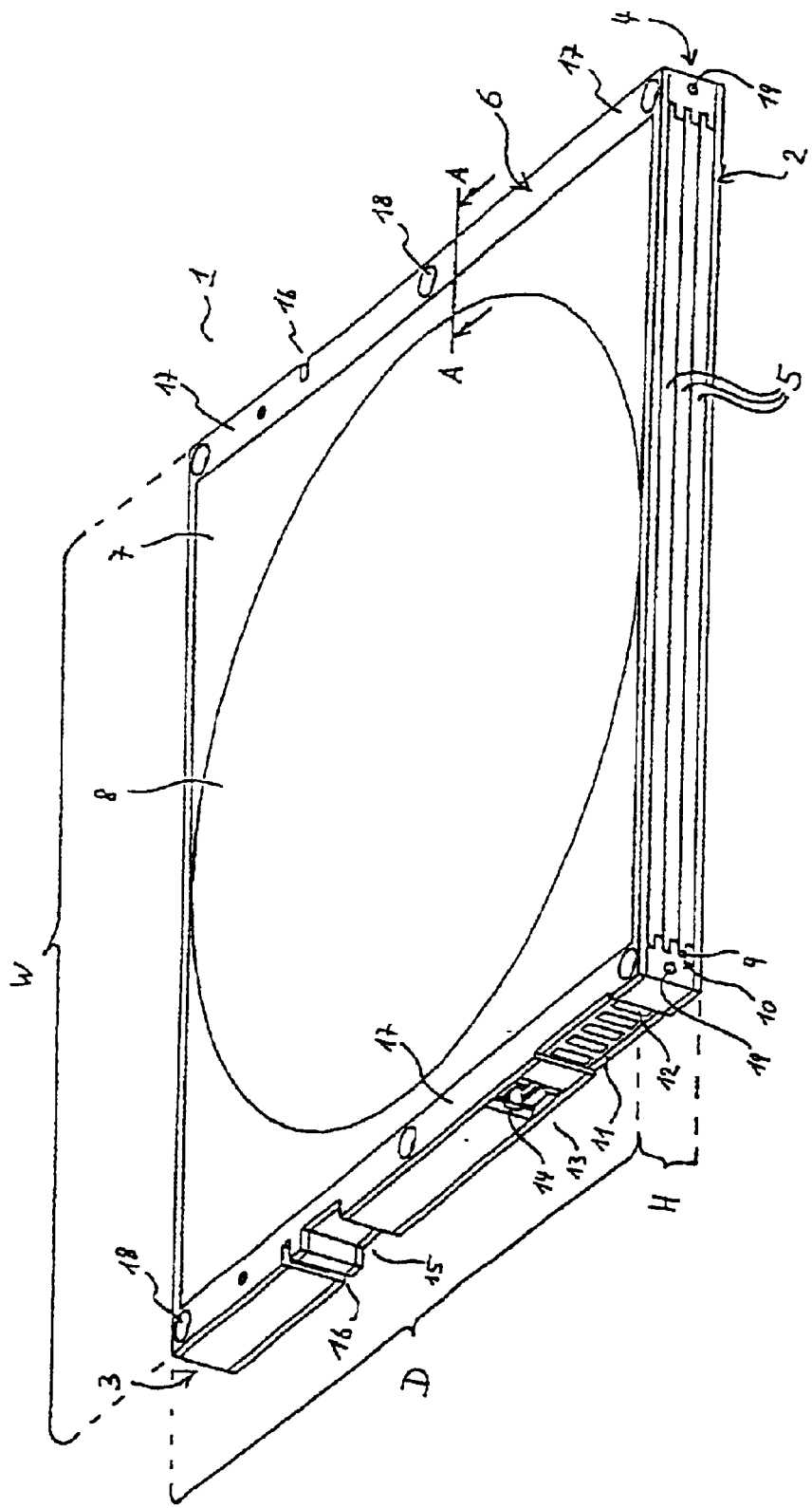
FIG. 1: perspective view of a container used with the invention.

FIG. 1 shows a perspective view of a container 1 used with the invention. The container consists of a bottom plate 2, side walls 3, 4 between which trays 5 are arranged and a cover plate 6. The cover plate 6 is provided at its upper, outer surface with a rectangular depression 7 in which a circular, transparent window 8 is arranged. Preferably, the transparent window 8 consists of the same material as the rectangular depression 7, wherein just the surface of the window 8 is smooth while the surface of the depression 7 is rough, so that transparency or intransparency is reached. Through the transparent window 8 it is easy to check the content of the upper one of trays 5.

The height H of the container 1 of FIG. 1 is much smaller than its depth D and its width W, both defining a first base line D and a second base line W of a rectangle being given by the dimensions of bottom plate 2 or cover plate 6. In the embodiment of FIG. 1 the dimensions of height H equals H=10 mm, depth D equals D=125 mm and width W equals W=142 mm. These dimensions are identical with those of a usual optical disk container, also called Jewel box. However, the container 1 according to the invention is able to store up to three disks 25 instead of a single one according to the usual container. As can be seen at the front side of container 1, the height of bottom plate 2 and cover plate 6 is half the size of each of the trays 5. That means, if two identical containers 1 are stacked one upon the other the difference between two trays 5 is always an integer multiple of the height of one tray 5, as the height of neighbouring bottom plate 2 and cover plate 6 add together to the height of one tray 5. As can be seen further the front sides of the trays 5 are plane and form together with the respective front sides of bottom plate 2, cover plate 6 and side walls 3, 5 a substantially plane front surface.

The trays 5 are provided with projections 9 at the upper end and being guided in guide grooves 10 of the side walls 3, 4. At the left side of the container 1, at side wall 3 there is arranged an identification area 11 which, in the Figure, comprises several electrical contacts 12. Instead of electrical contacts, it is also possible to arrange for optically accessible markings as for example a bar code or other contactless identification means. There is further provided read-write protection means 13, consisting of three dip-switches 14 for manually setting a read or write protection for each of the trays 5. Side wall 3 is further provided with an orientation groove 15 which has no counterpart at the other side and which is arrange asymmetrically, so that correct orientation of the container 1 can be assured by use of orientation groove 15. A release groove 16, which is also present at side wall 4, can be accessed in order to release one or several of the trays 5 to be able to be slit out of the container 1. Support areas 17, at which the height H is controlled to be very close to defined values are indicated, however, not visible in the scale used. There are three support areas 17 in order not to create indefiniteness. The container 1 is further provided with connector openings 18 to which connecting means may be attached in order to connect two or more containers 1 together to a single part.

Figure 2:
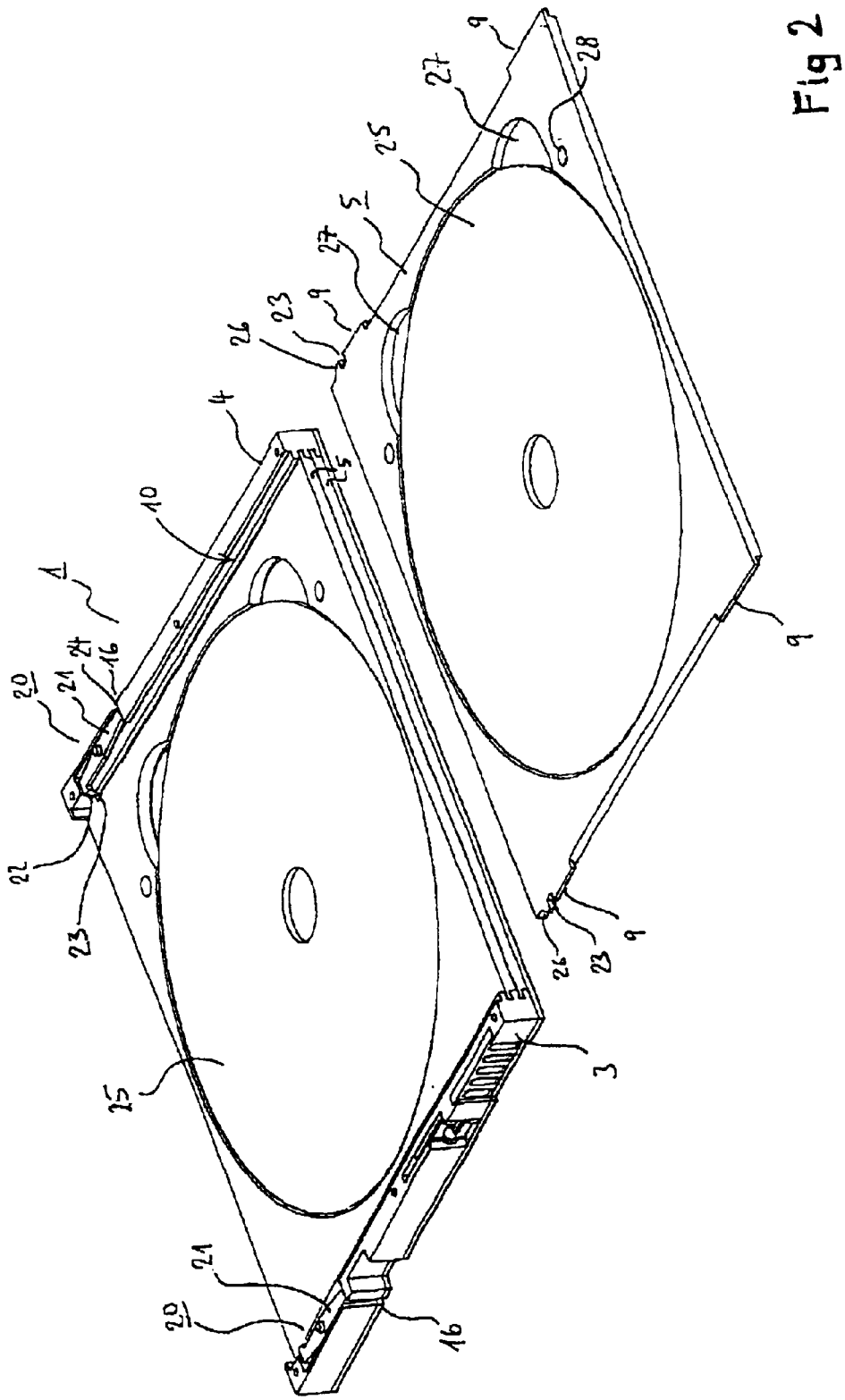
FIG. 2: perspective view of partly opened container.

Orientation grooves 19 are arranged at the height of the middle tray 5 at the front edge of the side walls 3 and 4. These orientation grooves 19 may be used in order to assure correct orientation of container 1 relative to a replay device. FIG. 2 shows a perspective view of a partly opened container 1. Same parts are indicated with same reference numbers throughout the application and are referred to only in case of different function or additional information. The cover plate 6 is removed in FIG. 2 (not shown), as well as the top one of trays 5 which is shown separately. Guide grooves 10 are visible now more clearly.

At the far end of side walls 3, 4 there are arranged releasable locking means 20. They consist of pivotable levers 21 having a first nose 22 to cooperate with a respective hole 23 of the tray 5 and a second nose being accessible at the release groove 16 from the outside. In the Figure, there is shown a single lever 21 in side wall 4 for releasing or locking all three trays 5 at the same time. At the other side wall 3, there are three levers 21 stacked one over another, so that by selecting one of these levers 21 a special tray to be released can be selected. Both visible trays are filled with an optical recording medium 25. The separated tray 5 shows clearly projections 9 and hole 23 to be guided in guide grooves 10. The projections 9 having holes 23 are provided with a rising edge 26 in order to move levers 21 when the tray 5 is inserted into its locked position. Gripping holes 27 are arranged within the tray 5 in order to be able to access the disk 25 by means of the fingers of a human hand. Orientation wholes 28 are provided in the tray 5 in order to assure exact positioning of the tray 5 in a playback device.

FIG. 3 shows a partly cross sectional view along line AA of FIG. 1. On the bottom plate 2 there is arranged at the right hand side a side wall 4 having guiding grooves 10. Within the guiding grooves 10 projections 9 of the trays 5 are guided. The projections 9 are arranged at the upper part of trays 5 and extend outwardly. At the lower part of the trays 5 there are arranged support areas 29 extending radially inwardly with respect to a circular depression of the tray 5. The circular depression accommodates the disk 25. As can be seen, the thickness of the support areas 29 is very small and reduces in radially inwardly direction. This ensures, that the optical recording medium 25 is supported only at its outer edge. Preferably the support areas 29 are provided with a slope at their upper surface as well as on their lower surface. This has the advantage that even in case that the container is turned upside down, the disk 25 housed in a tray 5 is supported by the neighbouring tray 5 at the sloped lower surface of its support areas 29. Similarly the inner part of cover plate 6 is provided with a sloped circular area 85 which is shown in FIG. 1A in an exaggerated manner. This sloped circular area 85 has also a disk supporting function in case of the container 1 being turned upside down.

FIG. 4 shows a bottom view of a container 1 used with the invention. The bottom plate 2 is provided with a rectangular depression 35 which depression is about 0.1 mm deep. The depression 35 is preferably used to stick a label on it. Because of the depth of the depression and the thickness of the label, which latter is smaller than the former, no additional thickness to the container 1 is added. At side wall 4 there is provided a depression 36 which is also suited for sticking a label on it. Here, too, the thickness of the label is smaller than the depth of the depression 36 so that the size of the container 1 is not increased even if a label is sticked on it. The advantage of a label sticked at depression 36 is, that it is visible, even if several containers 1 are stacked together. In this case only the depression 35 of the lowest container 1 in the stack would be visible, whereas all depressions 36 of the stacked containers 1 are visible, and thus all labels arranged there. In order to increase the size of depression 36 release groove 16 might be arranged nearer to the end of side wall 4. The dimensions of the outer surfaces of trays 5 and the parts surrounding trays 5 are such that there is only very small open space between trays 5 and surrounding parts. This ensures that it is very unlikely that dust or other particles that might have a disturbing effect may enter into the container 1.

FIG. 5 shows, in a perspective view, a different type of container used with the invention. Most parts are similar to those as described above especially with regard to FIG. 1 and therefore not described in detail here. Orientation groove 15 is arranged near the front edge 86 of the container. The side wall 3 does not extend up to this front edge 86 so that there is a space between bottom plate 2 and cover plate 6. Into this space hooks 87 of trays 5 extend. The hooks 87 have a slightly inclined face 88 in order to reliably coact with a pulling nose 113 (not shown) of a push-pull element 89 (not shown) for removing the tray 5 from container 1. Container 1 of this embodiment is provided with orientation grooves 19 at side walls 3,4 in order to provide for correct positioning of container 1 within a magazine or another storing device. Orientation grooves 19 as well as connector openings 18 may also be used to seize or grab container 1 in order to move it e.g. into a magazine type player or within such device. Also other openings or recesses of container 1 as e.g. orientation groove 15 may be used therefore. Container 1 is further provided with back walls 90 at least partly closing the back side of container 1 which is the visible side in the drawing. Thus the container is open for removal and insertion of trays 5 only at its front side while the opposite side, the back side, is partially closed. Back walls 90 assure higher stability of the container 1. It is to be understood that many of the features described here but not shown in other embodiments described elsewhere in this application may advantageously be incorporated there and vice versa.

Figure 6:
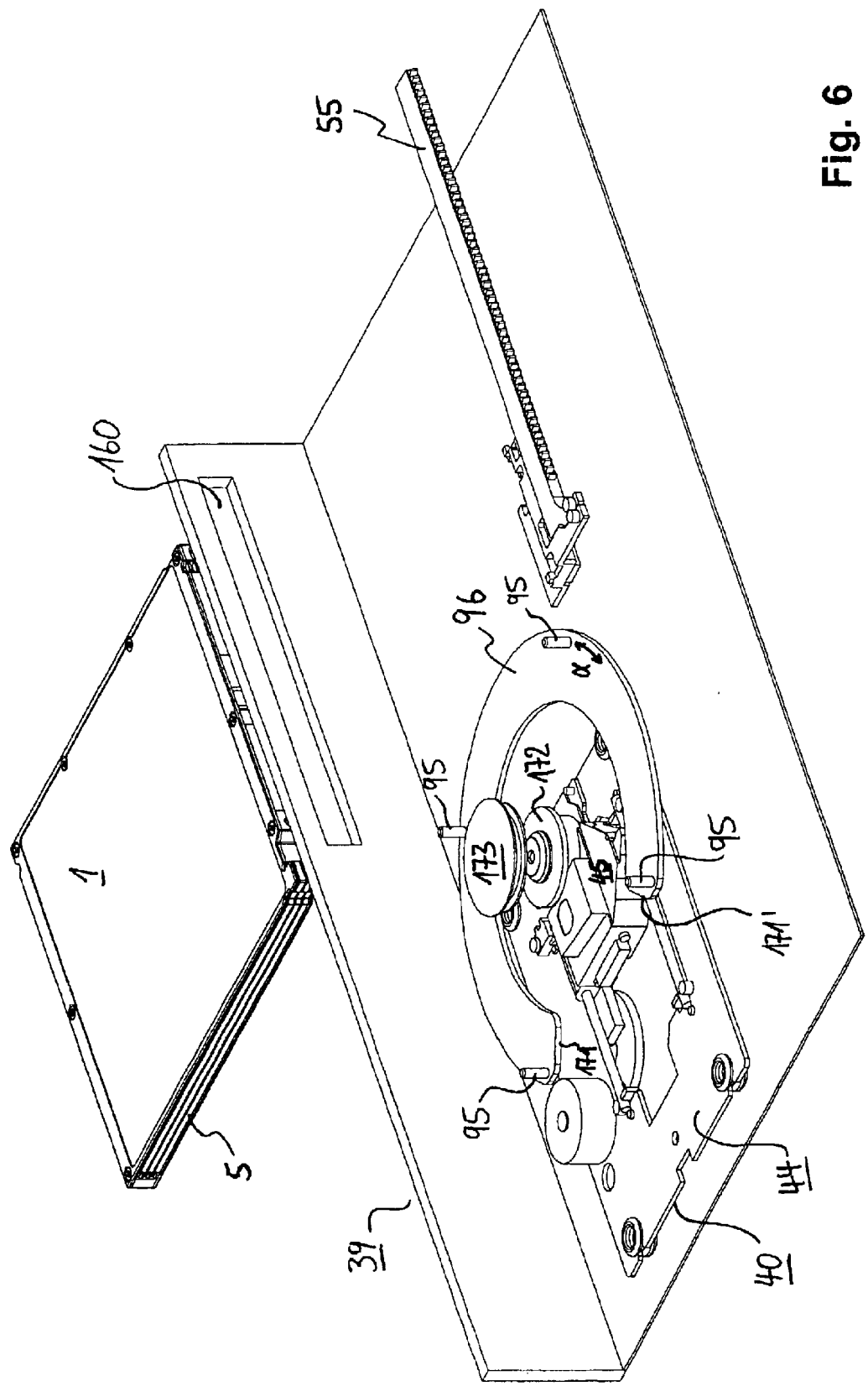
FIG. 6: container and device before insertion.

FIG. 6 shows a container 1 and magazine type player 39 before insertion. Container 1 is to be inserted through slit 160. Tray release slider 55 is provided for moving a tray 5 out of container 1 after insertion. Disk release ring 96 is provided with four disk release pins 95 the function of which will be described later. Disk release ring 96 is not a complete circular ring but is about c-shaped having an opening at ends 171, 171'. The opening defined by ends 171, 171' makes possible linear movement of an optical pick-up 45 of optical pick-up unit 40. This movement is possible even if disk release ring 96 is in a position as shown here or even in a lower position. As described here, disk release ring 96 is fixed in its position with regard to mechadeck 44, but is rotatable about a small angle a about the axis of rotational symmetry of its main circular shape. A turntable 172 is provided for rotating a disk-like recording medium (not shown here). A damper 173 is provided to be lowered so as to clamp the disk-shaped optical recording medium on turntable 172 in order to assure a correct rotation.

Figure 7:
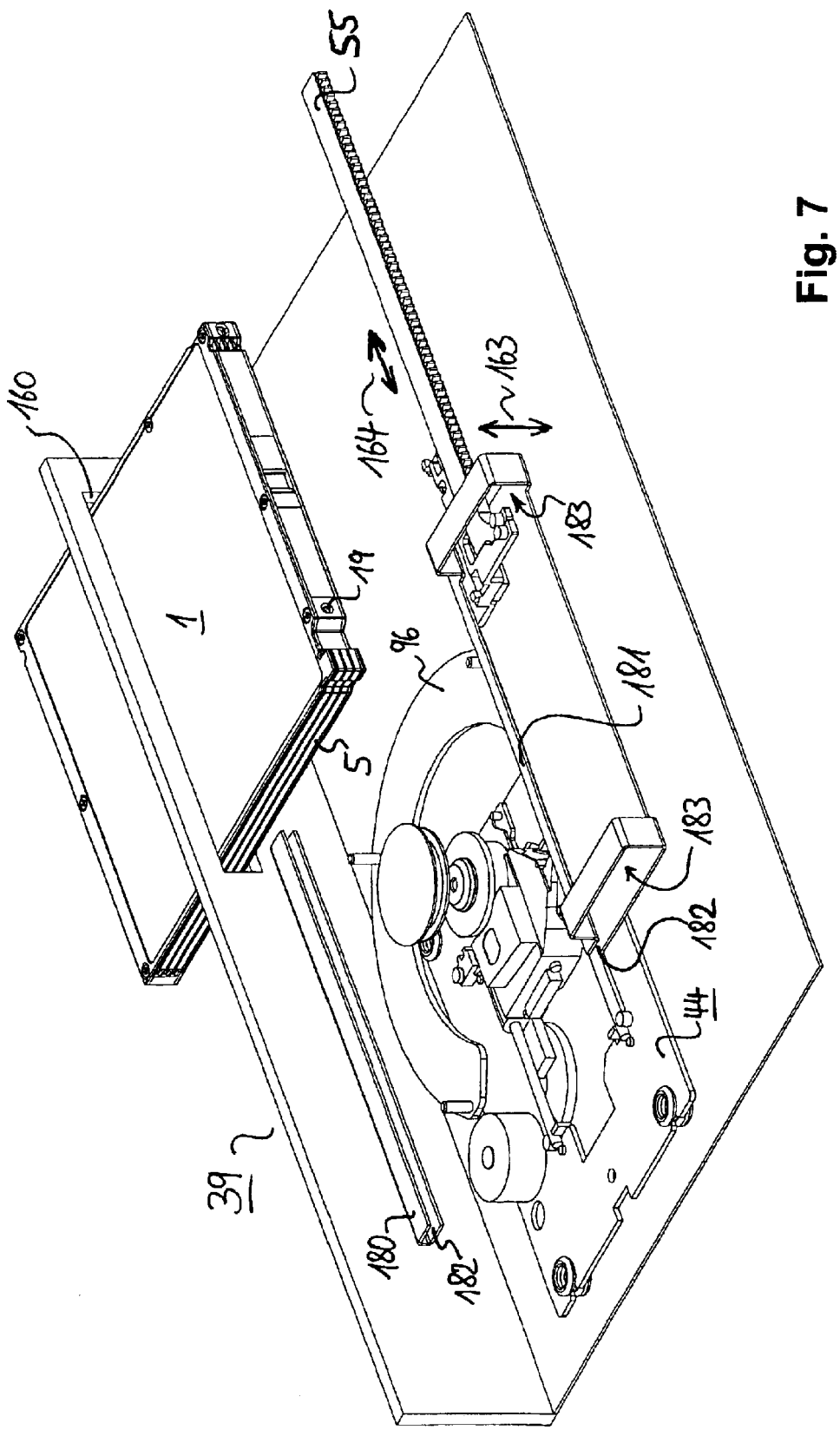
FIG. 7: container being inserted into device.

FIG. 7 shows container 1 during insertion into device 39 through slit 160. Insertion may be performed using certain mechanics or a drawer for the container 1, which are not shown here. Guiding rails 180, 181 are provided to guide a tray 5 when removed out of container 1 which shall be shown later. As shown here, both guiding rails 180, 181 have a guiding space 182 that is substantially the height of a tray 5. They are coupled to each other and to slider 55 in order to be moveable together in vertical direction as indicated by arrow 163. Guiding rail 181 is provided with two openings 183 to make possible horizontal movement of slider 55 relative to rail 181 in a direction as indicated by arrow 164.

Figure 8:
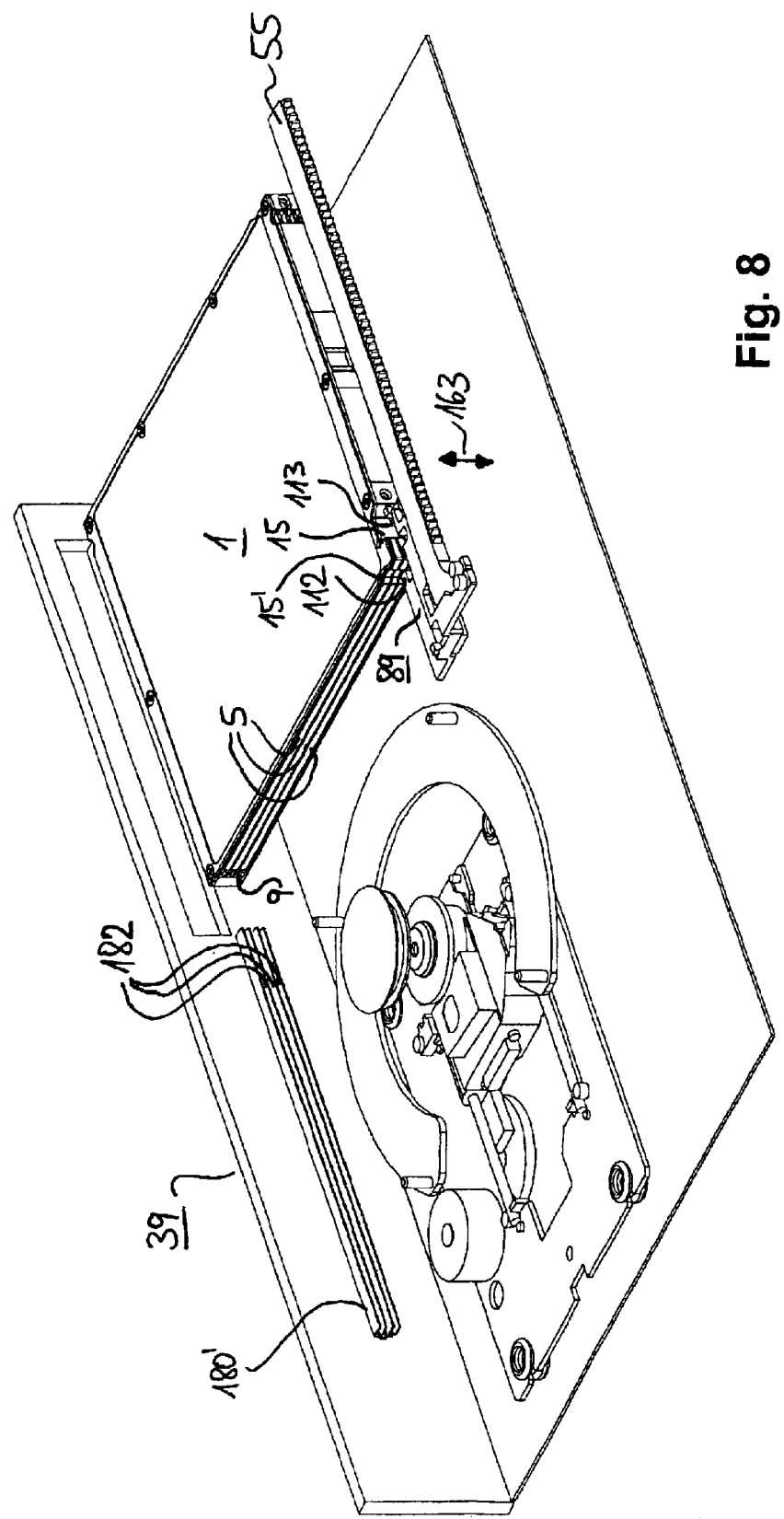
FIG. 8: container inserted position.

FIG. 8 shows a container 1 in its inserted position in device 39. Slider 54 is being moved from a position lower than container 1 into a position for actuating one of trays 5. As shown here it has reached the position of lowest tray 5. Push-pull element 89 engages with its pushing nose 112 and its pulling nose 113 orientation grooves 15, 15' of container 1. If container 1 is wrongly inserted or is an incorrect container, i.e. is not provided with orientation grooves 15, 15', movement of slider 55 in direction as indicated by arrow 163 is blocked thus indication of wrong type or wrong oriented container is possible. Different to the previous figure guiding rail 180' is fixedly attached to device 39. It is provided with guiding spaces 182 having the same dimension as projection 9 of trays 5 so as to guide trays 5 when removed from container 1. As vertical position of container 1 in the device is correctly adjustable, the positions of projection 9 and guiding space 182 coincide correctly. Guiding rail 181 is not shown here for simplicity reasons.

Figure 9:
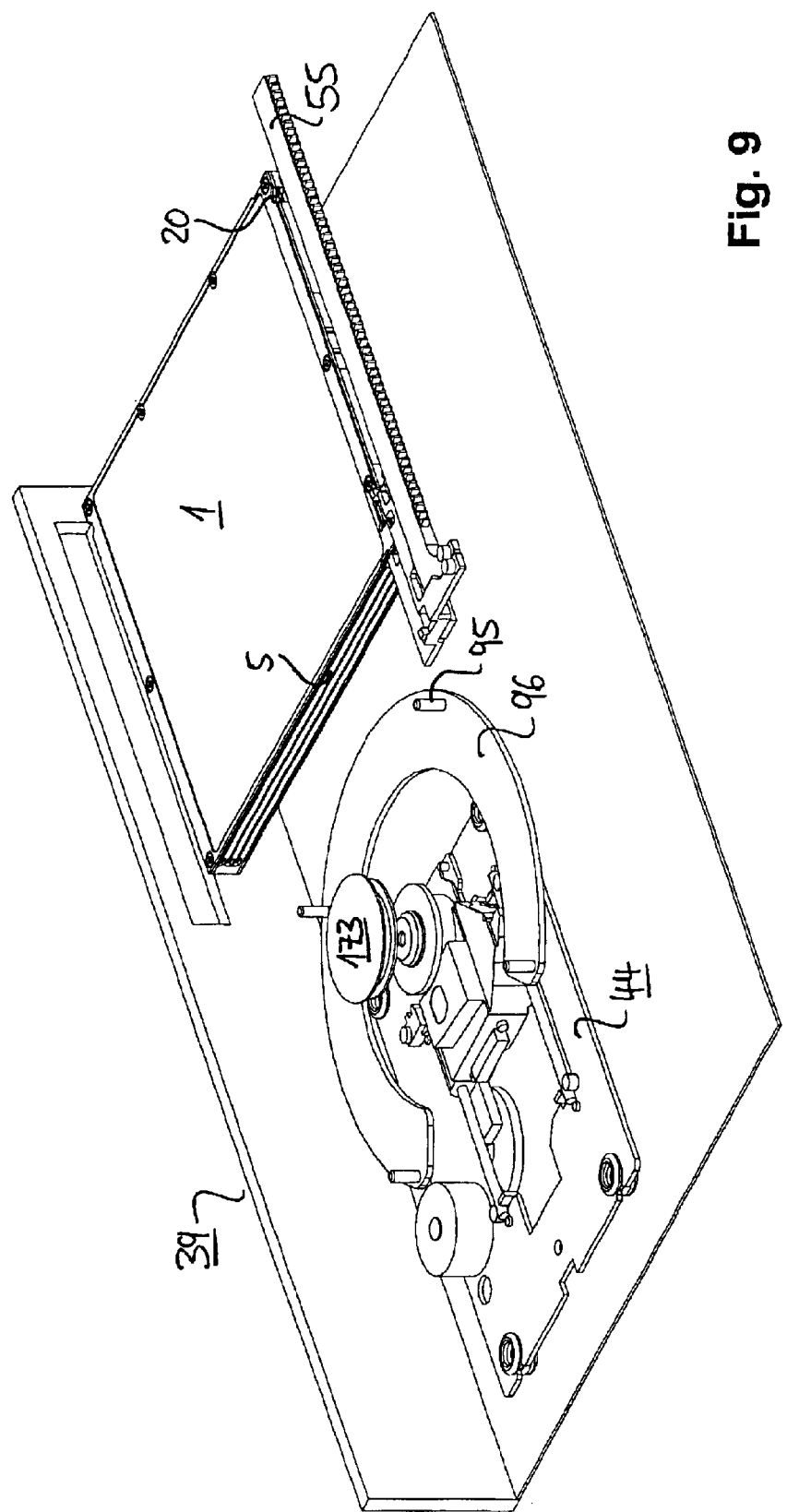
FIG. 9: tray release slider in release position.

FIG. 9 shows slider 55 in a released position to remove upper tray 5 from container 1. Releasable locking means 20 for the upper tray 5 is actuated (not shown here) in order to allow movement of upper tray 5 out of container 1. For simplicity reasons none of the guiding rails is shown here. Disk release ring 96 and mechadeck 44 are in a lowered position so as to not coming into contact with tray 5 during its movement out of the container. That means that even disk release pins 95 are well below tray 5. On the other hand, damper 173 is arranged in an upper position so as to not come into contact with tray 5 during its movement.

Figure 10:
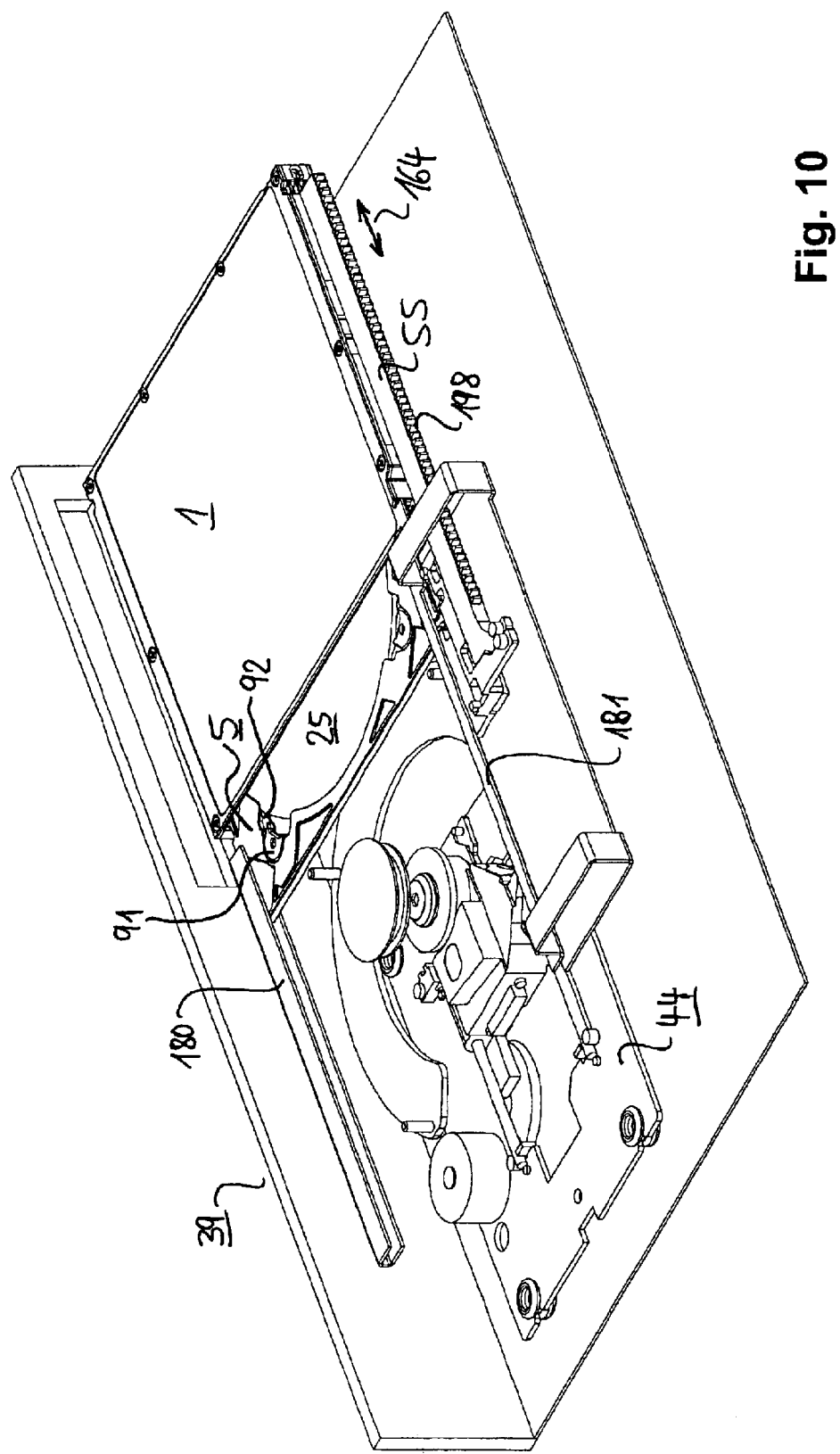
FIG. 10: tray being moved out of container.

FIG. 10 shows a tray 5 when being removed from container 1. Slider 55 is therefore moved in a direction as indicated by arrow 164. It is therefore provided with a toothed rack 198 to which a toothed wheel (not shown) is attached. It can be seen how tray 5 is guided by guiding rails 180, 181. It can further be seen that the storage medium disk 25 is held by holding projections 92 of disk holders 91 of tray 5.

Figure 11:
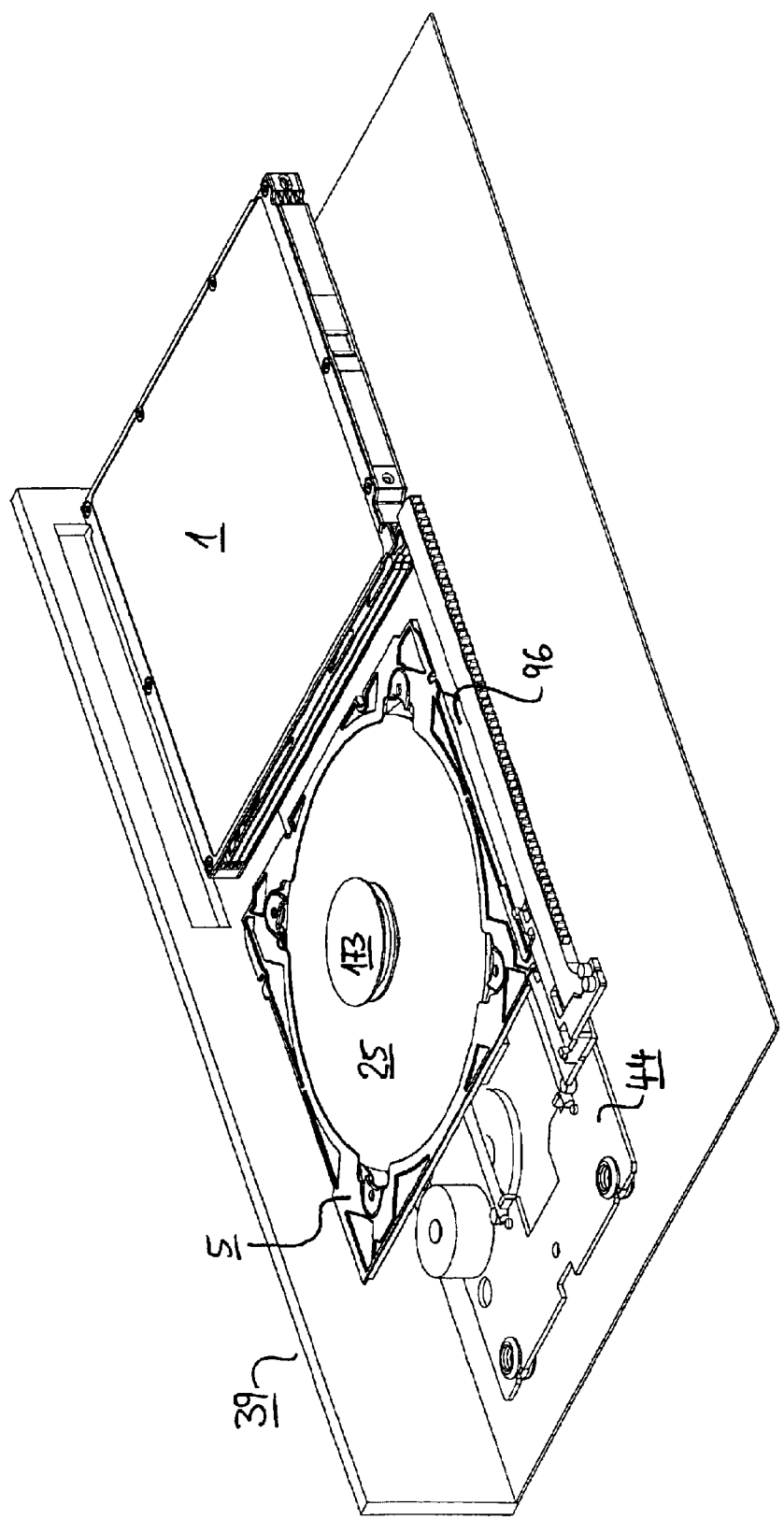
FIG. 11: final position for tray.

FIG. 11 shows the final position of tray 5. Clamper 173 is still above, i.e. not in contact with disk 25 and mechadeck 44 as well as disk release ring 96 is still not in contact with tray 5 or disk 25.

Figure 12:
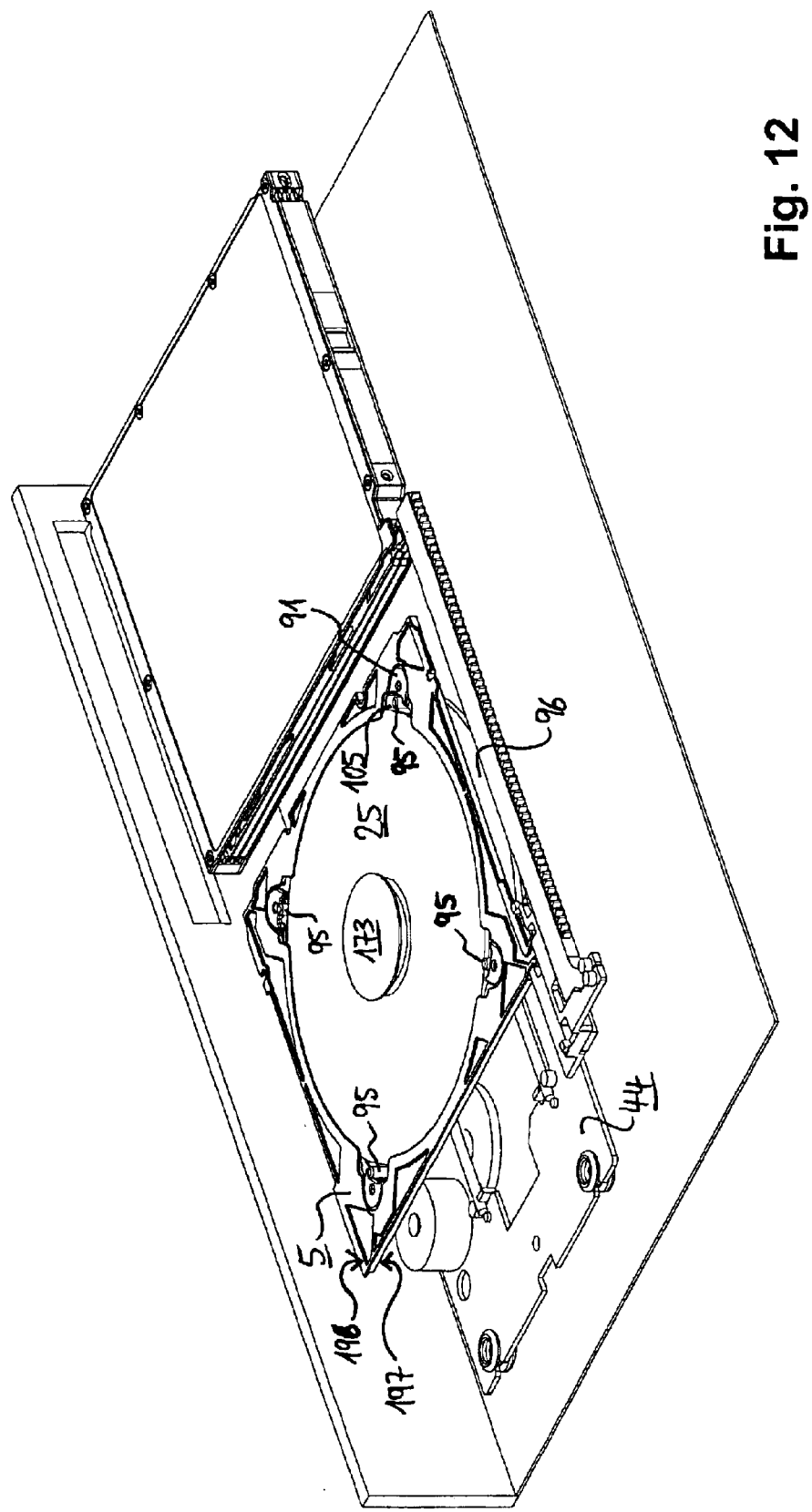
FIG. 12: mechadeck in tray contact position.

FIG. 12 shows mechadeck 44 and clamper 173 in a contact position with the tray 5 or disk 25, respectively. Turntable 172 (not visible here) contacts disk 25 from below while damper 173 contacts disk 25 from above. Disk release pins 95 extend through openings 105. As could be seen, mechadeck 44 as well as disk release ring 96 have been moved towards the lower side 197 of tray 5 while damper 173 has been moved towards the opposite side, the upper side 196 of tray 5. This movement is shown here as a linear movement. This movement is driven by a motor and appropriate gear means.

Figure 13:
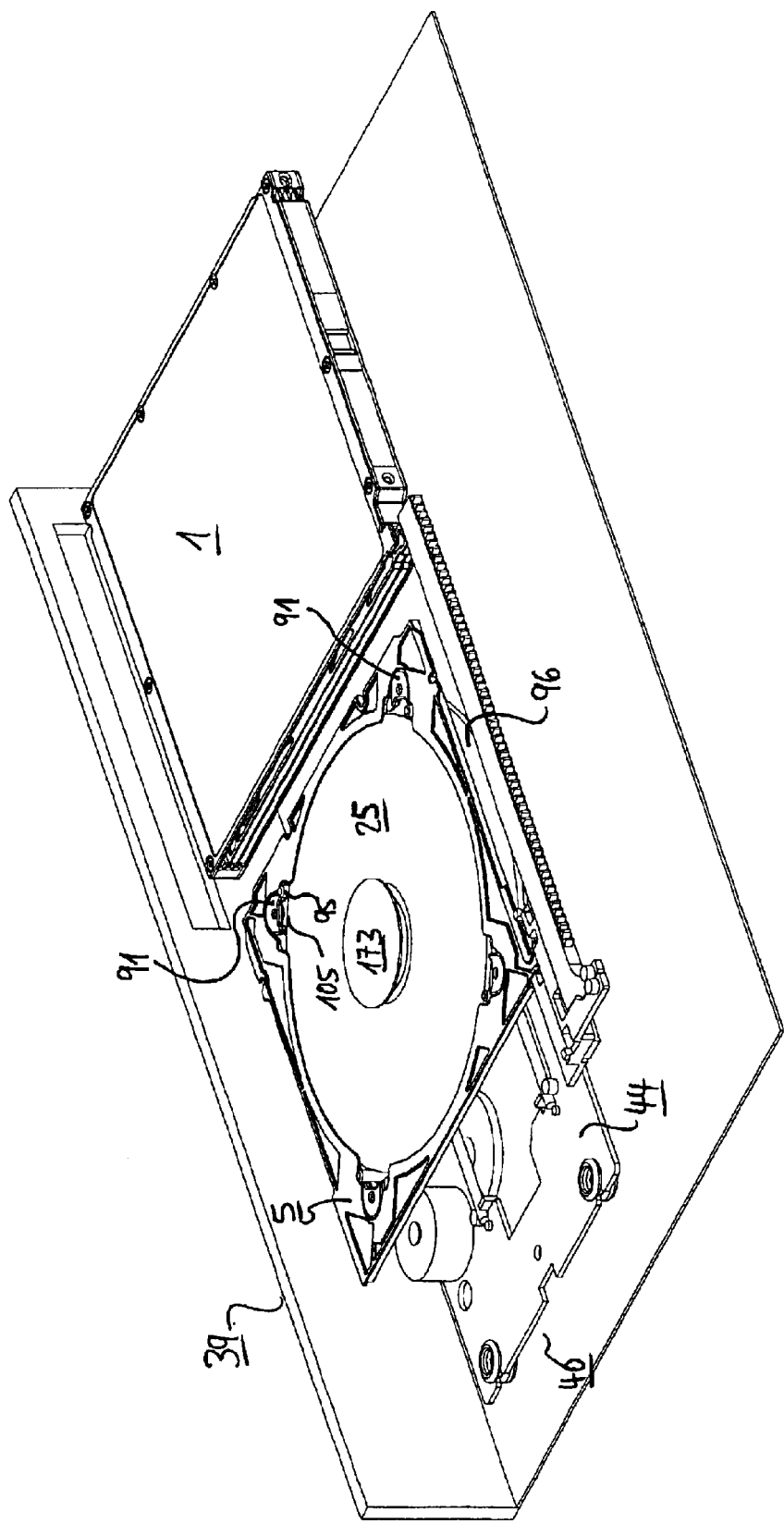
FIG. 13: disk released from tray.

FIG. 13 shows how disk 25 is released from tray 5. Mechadeck 44 of optical pick-up unit 40 is already moved upwards compared to its previous position. Disk release ring 96 is mechanically coupled to mechadeck 44 and thus also already moved upwards. Thereby, disk release pins 95 extend through openings 105 between tray 5 and disk 25. Rotation of disk release ring 96 about a small angle brings disk release pins 95 into contact with disk holders 91 in order to rotate them to assume a disk release position. Disk holders 91 as shown in FIG. 13 are already in the disk release position while those shown in FIG. 12 are still in the disk holding position. Disk 25 is now supported by turntable 172, not visible here, and clamped on turntable 172 by damper 173. Disk release pins 95 extend so far from disk release ring 96 that there is sufficient play between disk release ring 96 and disk 25 in order to provide rotation of disk 25. However, disk 25 is still in contact or at least nearly in contact with tray 5 as shown in this figure.

Figure 14:
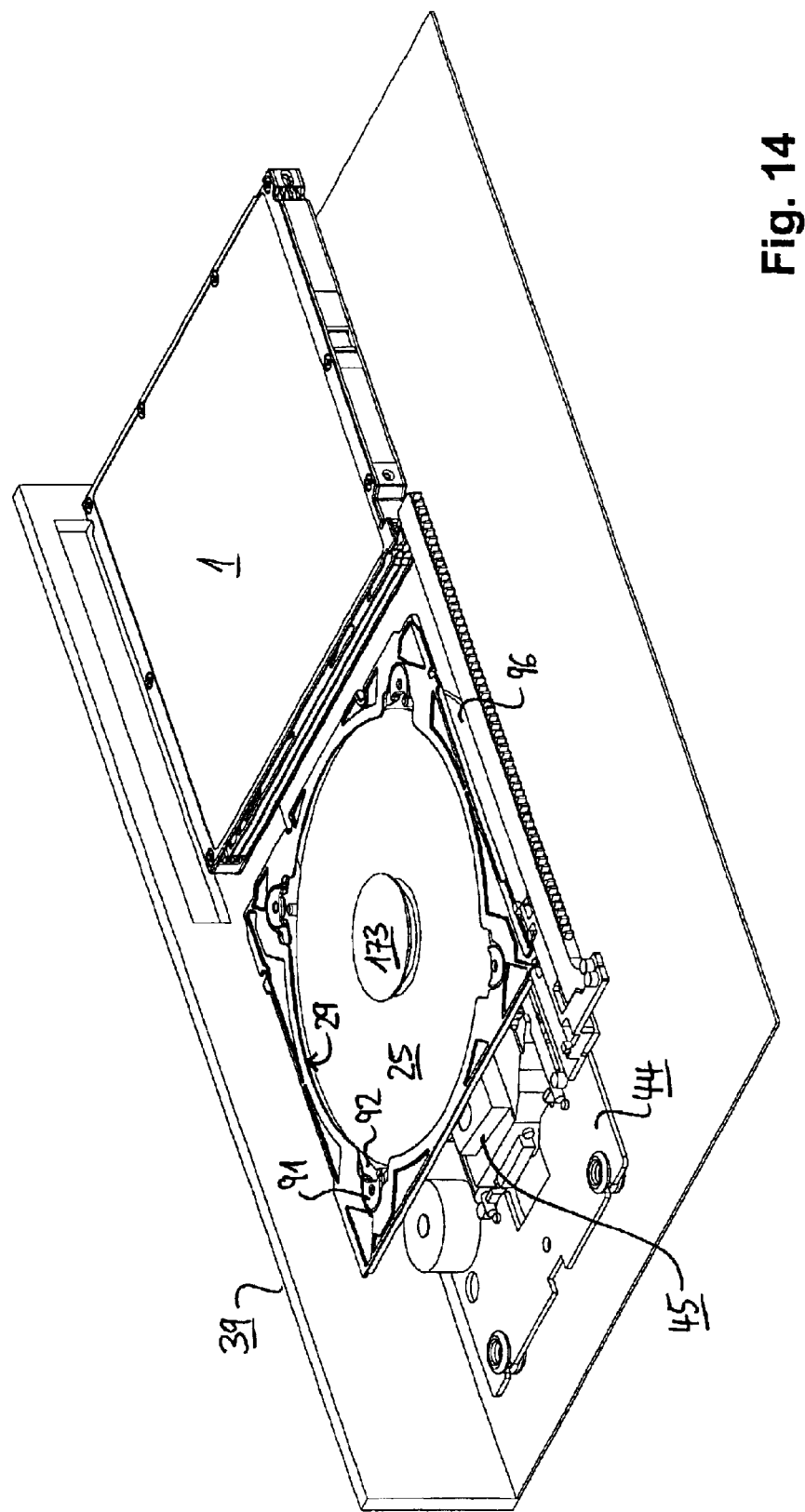
FIG. 14: playback position reached.

FIG. 14 shows the playback position of disk 25, which is reached by lowering mechadeck 44 and damper 173 about a small distance. In this view holding projections 92 of disk holders 91 are visible. In the holding position of disk holders 91 these projections 92 hold the disk at the lower surface of its outer rim while the upper surface of its outer rim is in contact with support area 29. In an alternative embodiment, which is not shown here, mechadeck 44 is provided fixed in device 39 while disk release ring 96 is moved upwards to release disk 25, which is then held by the inner circumference of ring 96. Then, ring 96 is lowered so as to bring disk 25 into contact with turntable 172. Ring 96 is lowered further to allow for free rotation of disk 25, which is clamped by damper 173. For returning disk 25 back to tray 5 the afore mentioned actions are performed in opposite order for both alternatives. An advantage of the first alternative is that disk release ring 96 does not need to provide holding support for disk 25 and that it does not need to be provided with orientation means to assure the correct positioning of disk 25. The second alternative has the advantage that not the complete mechadeck 44 is to be moved upwards and downwards but only disk release ring 96. This allows to design the upwards and downwards movement mechanics and drives simpler than in the first alternative.

It is visible that optical pickup 45 is in its outermost left position whereas it is shown in the previous figures in its outermost right position. Said outermost right position corresponds to the radial inner position with regard to disk 25 while the outermost left position refers to the radially outer position with regard to disk 25. Undisturbed movement of pickup 45 between its outermost positions is possible as disk release ring 96 has an opening as described before.

Figure 15:
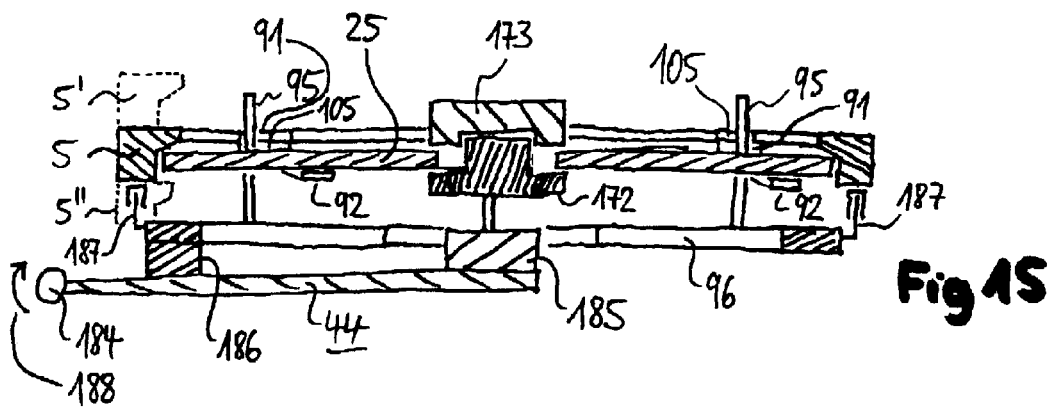
FIG. 15: mechadeck with tilting movement.

FIG. 15 shows in a cross-sectional diagrammatical view mechadeck 44 provided for tilting movement in contact with disk 25 coupled to tray 5 of middle position. Indicated by dotted lines are upper tray 5' and lower tray 5". Mechadeck 44 is tiltable about axis 184. To mechadeck 44 turntable 172 is affixed via disk motor 185. Disk release ring 96 is attached to mechadeck 44 via ring holder 186, which also performs rotation of ring 96 about a small angle as described above. This functionality is not shown in detail here. Also only diagrammatically shown are sensors 187, which are affixed to ring 96 and produce a sensor signal when contacting tray 5. Also visible are disk release pins 95 which extend through openings 105. Holding projections 92 of disk holders 91 are also visible. Clamper 173 abuts turntable 172 so that disk 25 is clamped between these two parts. For enabling free rotation of disk 25 mechadeck 44 is tilted about a small angle as indicated by arrow 188 after disk holders 91 have been released. Thereby disk 25 is brought out of contact with tray 5.

Figure 16:
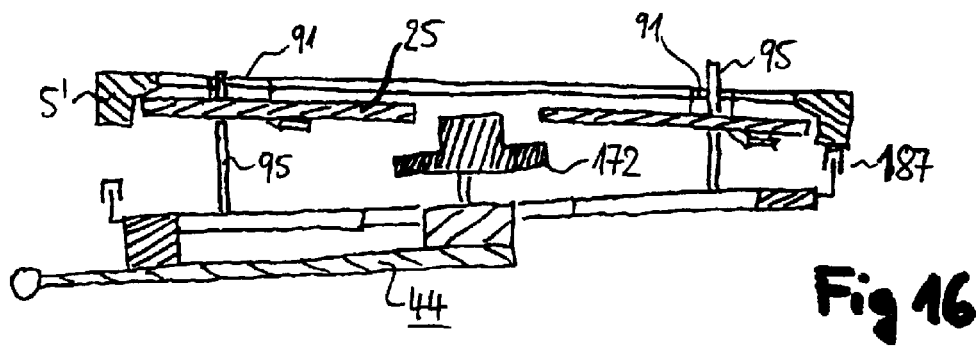
FIG. 16: mechadeck and disk affixed to upper tray.
Figure 17:
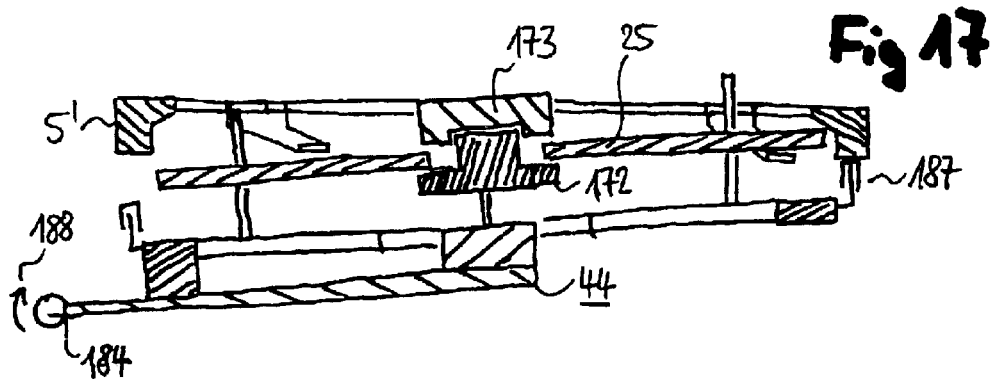
FIG. 17: mechadeck returning disk to upper tray.
Figure 18:
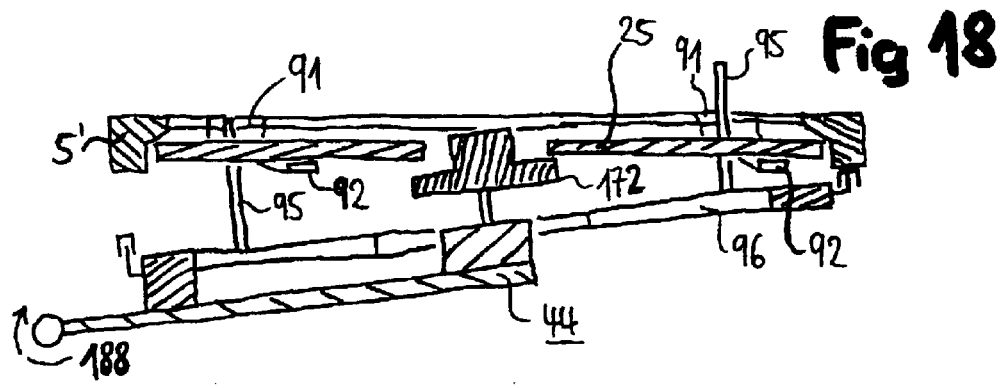
FIG. 18: mechadeck having returned disk to upper tray.

FIG. 16 shows the situation when mechadeck 44 comes into contact with upper tray 5' via sensor 187. Contact is indicated and further tilting movement of mechadeck 44 is stopped. Via release pins 95 disk holders 91 are moved into the release position which makes disk 25 fall about a small distance until it is stopped by turntable 172. Clamper 173 is lowered and ensures that disk 25 is clamped to turntable 172 as shown in FIG. 17. From this position mechadeck 44 is rotated about a small angle as indicated by arrow 188 to allow undisturbed rotation of disk 25. For returning disk 25 back to upper tray 5' mechadeck 44 is tilted about axis 184 in opposite direction as indicated by arrow 188 until it assumes the position as shown in FIG. 17. This position is sensed by sensor 187 so that further movement is stopped. Then damper 173 is removed and mechadeck 44 is tilted about a small angle further in opposite direction of arrow 188. As disk 25 already abuts at the right side of FIG. 17 to tray 5' it is tilted in clockwise direction until also its left side as shown contacts upper tray 5'. This position is shown in FIG. 18 where it is visible that disk 25 is held by right side of turntable 172 against tray 5'. Now rotation of disk release ring 96 makes disk release pins 95 actuate disk holders 91 in order to bring them back into a holding position in which holding projections 92 grip below the lower surface of disk 25 thus holding disk 25 tight at tray 5'. Mechadeck 44 is now tilted in clockwise direction as indicated by arrow 188 to come out of contact with tray 5 in order to make possible movement of tray 5' into container 1 as described above. It is to be noted that the tilting movement is shown in diagrammatical way in which angles and distances not necessarily correspond to real relations and are partly exaggerated.

What is claimed is:

1. Scanning device (39) for storage media (25) whereby several storage media (25) being housed in a container (1), a storage medium (25) being coupled to a tray (5) of the container (1), which tray (5) is removed completely from container (1) for enabling scanning of the storage medium (25), the container (1) being inserted into the scanning device (39), an optical pickup (45) of the scanning device (39) being arranged on a mechadeck (44), the mechadeck (44) being moveable towards a first slide (197) of the tray (5) in its position removed from the container (1), a disk release ring (96) being coupled to the mechadeck (44) and being moveable towards or away from the tray (5) in its removed position, the disk release ring (96) being moveable in order to actuate a disk holder (91) of the tray (5), the disk release ring (96) having the shape of an open ring and being moveable towards the same side (197) of the tray (5) as the mechadeck (44).

2. Scanning device (39) of claim 1, characterized in that it is provided with a damper (173) being moveable towards said tray (5) in its remove position at its opposite side (196) with regard to the mechadeck (44).

3. Scanning device (39) according to claim 1, characterized in that the movement of said mechadeck (44) towards or away from said tray (5) is a tilting movement.

4. Scanning device (39) according to claim 3, characterized in that it is provided with guiding rails (180, 180', 181) being arranged corresponding to the different positions of said trays (5) inside said container (1).

5. Scanning device (39) according to claim 1, characterized in that it is provided with a sensor (187) for detecting direct or indirect contacting of mechadeck (44) and tray (5).

6. Scanning device (39) according to claim 5, characterized in that the movement of said mechadeck (44) towards or away from said tray (5) is a tilting movement.

7. Scanning device (39) according to claim 6, characterized in that it is provided with guide rails (180, 180', 181) being arranged corresponding to the different positions of said trays (5) inside said container (1).

8. Scanning device (39) according to claim 1, characterized in that it is provided with guiding rails (180, 180', 181) being arranged corresponding to the different positions of said trays (5) inside said container (1).

9. Scanning device according to claim 1, characterized in that the height of a tray (5) corresponds to the sum of heights of bottom plate (2) and cover plate (6) of said container (1).

10. Method to move a storage medium (25) from a container (1), housing several trays (5) to which a storage medium (25) is coupled, into a scanning position of a scanning device (39), having the steps of:

moving a tray moving slider (55) in a first direction (163) to assume a position to cooperate with one of the trays (5) of container (1), moving said tray moving slider (55) in a second direction (164) to remove said tray (5) from said container (1), moving a mechadeck (44) and a disk release ring (96) from the same side (197) towards said tray (5) until mechadeck (44) and storage medium (25) contact each other, fixing said storage medium (25) to said mechadeck (44), releasing the coupling between storage medium (25) and tray (5), and moving said mechadeck (44) away from said tray (5) to assume the scanning position.

11. Method to move a storage medium (25) from a scanning position of a scanning device (39) onto a container (1) wherein the steps of claim 10 are reversed.

* * * * *